US012684397B2

(12) United States Patent
Sung et al.

(10) Patent No.: US 12,684,397 B2
(45) Date of Patent: Jul. 14, 2026

(54) FILTER DEFINED SINGLE WIDE CARRIER

(71) Applicant: T-Mobile Innovations LLC, Overland Park, KS (US)

(72) Inventors: Hui-Hsia Sung, Bellevue, WA (US); Brian Olsen, Kirkland, WA (US); Egil Gronstad, Encinitas, CA (US); Karri Kuoppamaki, Kirkland, WA (US); Abdul Saad, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 507 days.

(21) Appl. No.: 17/879,383

(22) Filed: Aug. 2, 2022

(65) Prior Publication Data

US 2024/0049036 A1     Feb. 8, 2024

(51) Int. Cl.
| | |
|---|---|
| *H04W 28/02* | (2009.01) |
| *H04B 1/00* | (2006.01) |
| *H04L 5/00* | (2006.01) |
| *H04W 72/0453* | (2023.01) |

(52) U.S. Cl.
CPC ...... H04W 28/0215 (2013.01); H04B 1/0078 (2013.01); H04L 5/0048 (2013.01); H04W 72/0453 (2013.01)

(58) Field of Classification Search
CPC .......... H04W 72/0453; H04W 28/0215; H04L 5/0048; H04B 1/0078
See application file for complete search history.

(56) References Cited

U.S. PATENT DOCUMENTS

| | | | |
|---|---|---|---|
| 9,325,553 B2 | 4/2016 | Kaukovuori et al. | |
| 10,211,855 B2 | 2/2019 | Baringer et al. | |
| 2013/0044621 A1* | 2/2013 | Jung ...................... | H04J 11/005 |
| | | | 370/336 |
| 2015/0038098 A1* | 2/2015 | Guldberg ............... | H04B 15/00 |
| | | | 455/296 |
| 2017/0238316 A1* | 8/2017 | Li ...................... | H04W 72/0453 |
| | | | 370/329 |
| 2020/0305184 A1* | 9/2020 | Kim ...................... | H04W 16/14 |

* cited by examiner

*Primary Examiner* — Shukri Taha
(74) *Attorney, Agent, or Firm* — Jones Burke, PLLC

(57) ABSTRACT

Systems, methods, and access nodes are provided for providing a filter defined carrier. The systems and methods include selecting, at an access node, a frequency range encompassing multiple spectrum blocks and applying a digital filter to the frequency range to eliminate at least one spectrum block within the frequency range to create a carrier having a profile. The method additionally includes comparing the profile to capabilities of a wireless device and allowing the wireless device to connect to the access node in compliance with the profile and its capabilities.

20 Claims, 9 Drawing Sheets

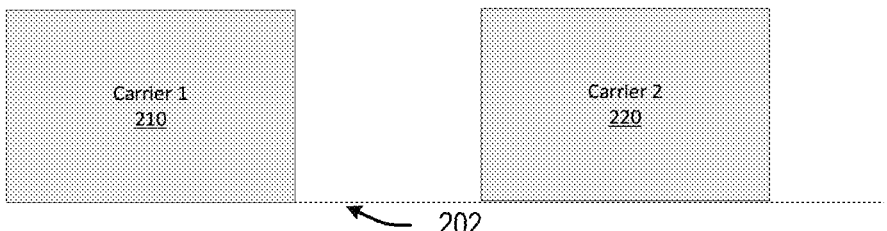
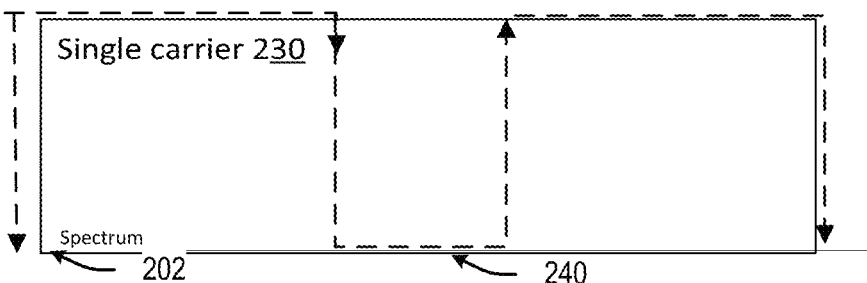
FIG. 2

300
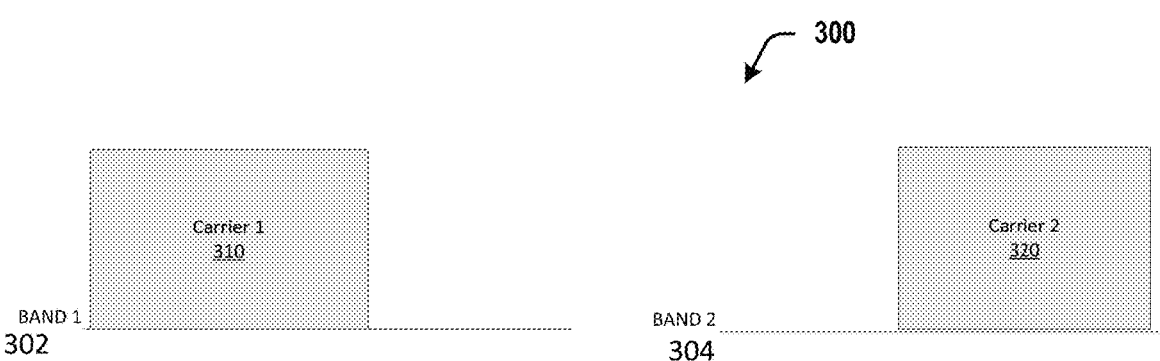
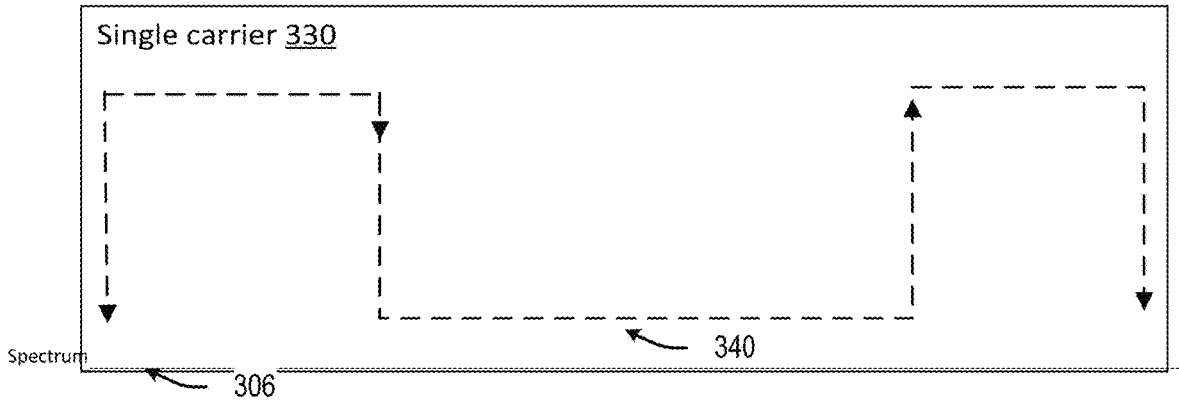
FIG. 3

500

600

SELECT A RANGE OF
SPECTRUM BLOCKS
610

APPLY DIGITAL FILTER TO
RANGE OF SPECTRUM BLOCKS
TO ELIMINATE UNUSABLE
SPECTRUM BLOCKS AND
CREATE PROFILE OF CARRIER
620

COMPARE PROFILE TO
CAPABILITIES OF WIRELESS
DEVICE
630

ASSIGN WIRELESS DEVICE TO
MATCHING SPECTRUM
BLOCKS OF CARRIER BASED
ON COMPARISON
640

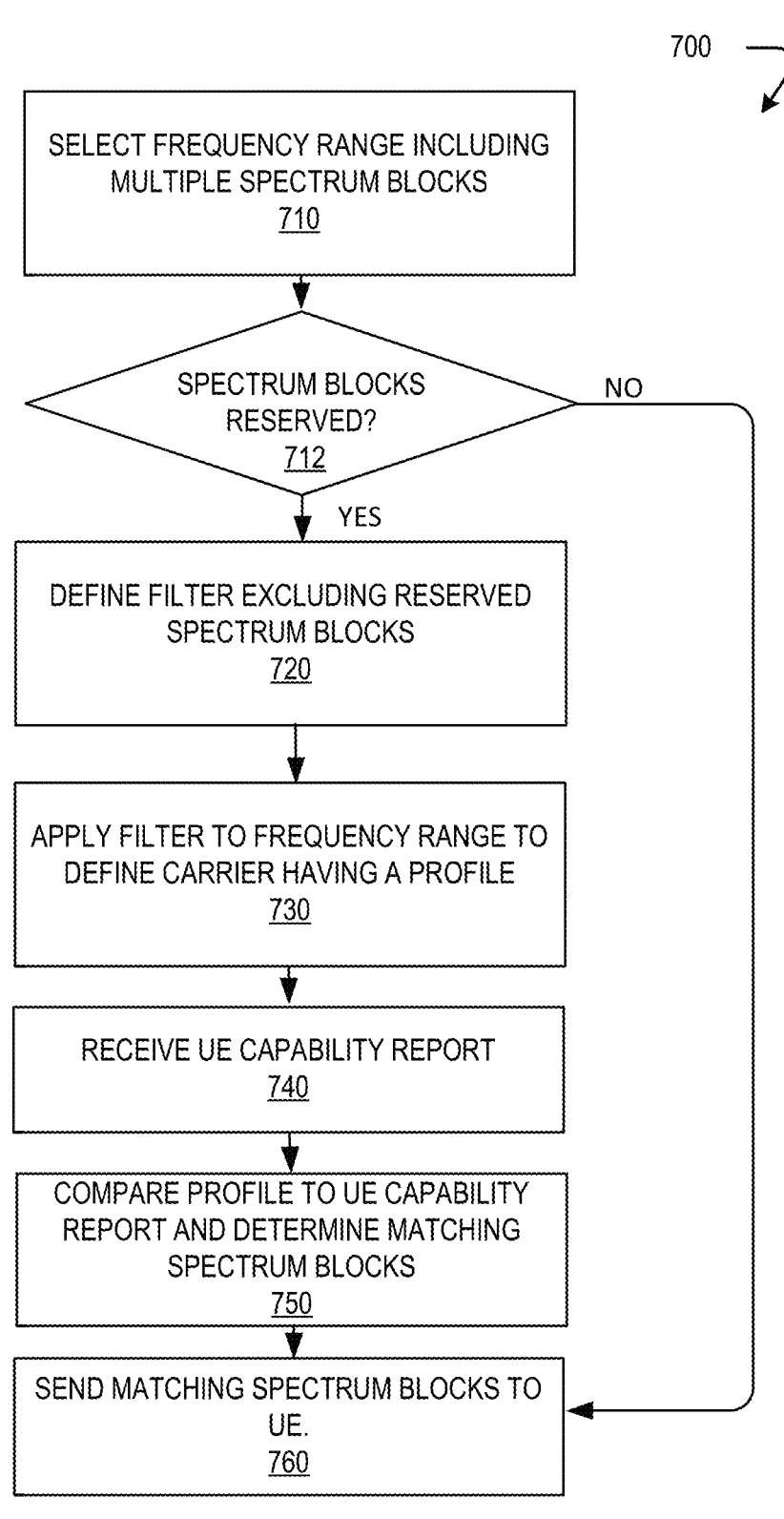

700

SELECT FREQUENCY RANGE INCLUDING
MULTIPLE SPECTRUM BLOCKS
710

SPECTRUM BLOCKS
RESERVED?
712

NO

YES

DEFINE FILTER EXCLUDING RESERVED
SPECTRUM BLOCKS
720

APPLY FILTER TO FREQUENCY RANGE TO
DEFINE CARRIER HAVING A PROFILE
730

RECEIVE UE CAPABILITY REPORT
740

COMPARE PROFILE TO UE CAPABILITY
REPORT AND DETERMINE MATCHING
SPECTRUM BLOCKS
750

SEND MATCHING SPECTRUM BLOCKS TO
UE.
760

FIG. 7

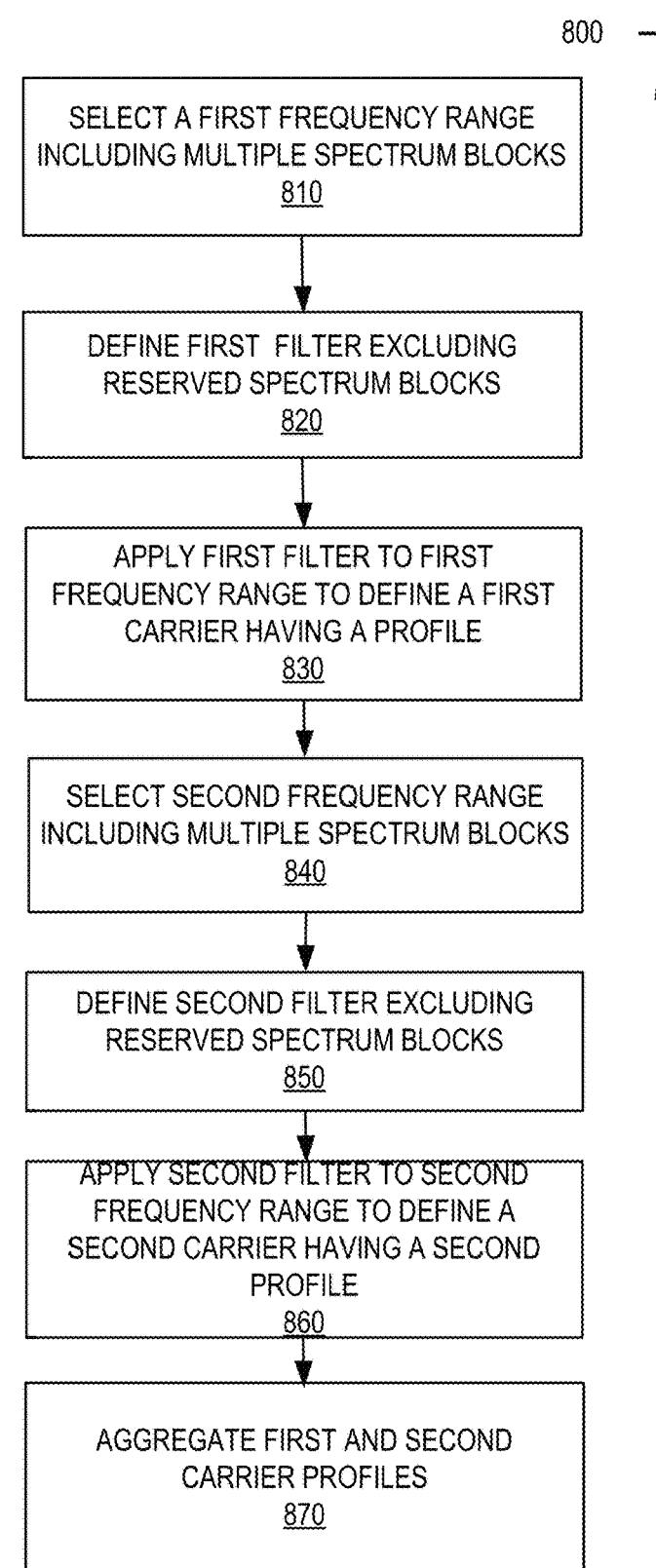

800

SELECT A FIRST FREQUENCY RANGE
INCLUDING MULTIPLE SPECTRUM BLOCKS
810

DEFINE FIRST FILTER EXCLUDING
RESERVED SPECTRUM BLOCKS
820

APPLY FIRST FILTER TO FIRST
FREQUENCY RANGE TO DEFINE A FIRST
CARRIER HAVING A PROFILE
830

SELECT SECOND FREQUENCY RANGE
INCLUDING MULTIPLE SPECTRUM BLOCKS
840

DEFINE SECOND FILTER EXCLUDING
RESERVED SPECTRUM BLOCKS
850

APPLY SECOND FILTER TO SECOND
FREQUENCY RANGE TO DEFINE A
SECOND CARRIER HAVING A SECOND
PROFILE
860

AGGREGATE FIRST AND SECOND
CARRIER PROFILES
870

FILTER DEFINED SINGLE WIDE CARRIER

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)).

As access nodes have evolved, networks may include a combination of multiple access node such as 4G LTE evolved NodeBs (eNodeBs or eNBs) and 5G NR next generation NodeBs (gNodeBs or gNBs) or alternatively may be exclusively 4G or 5G cellular systems. 5G networks aim to offer new technical solutions allowing for a greater throughput, lower latency, higher reliability, higher connectivity, and higher mobility range than previous technologies. 5G networks are also expected to extend the flexibility in the network usage and to enable users with a wider range of use cases and business models.

Within the above-described networks, various frequency spectrum bands and portions of spectrum bands (spectrum blocks) can be used by different wireless devices in different networks. First, different types of wireless device support different spectrum bands. Further, different cellular carriers have access to different spectrum bands and spectrum blocks. Generally, three layers of spectrum include low, mid, and high bands. Higher frequency bands typically accommodate more traffic but allow signals to travel lesser distances. Lower frequency bands accommodate less traffic but allow signals to travel longer distances.

During connection setup, wireless device users, based on their wireless device and supporting network are matched with a particular spectrum band. In some instances, in order to enhance wireless device performance by increasing data rate per user, wireless devices are able to use multiple spectrum blocks within a spectrum band (or from different spectrum bands) by implementing carrier aggregation (CA). CA allows wireless devices to use multiple spectrum or frequency blocks (also called component carriers), which may be contiguous or non-contiguous and in the same frequency band or in different frequency bands. The maximum possible data rate per user is increased as more frequency blocks are assigned to a user. Thus, depending on the positions of the component carriers, three cases of carrier aggregation are possible. In a first case, component carriers are contiguous in the same frequency band. This is called intra-band contiguous carrier aggregation. If the component carriers are in the same frequency band but are separated by a gap the earlier aggregation is called intra-band non-contiguous CA. Inter-band CA occurs when the component carriers lie in different frequency band.

While CA may improve wireless device performance, it also may increase overhead and consume network resources. This is especially true when a network utilizes three or four blocks of spectrum within a single band. Combining these blocks by implementing CA is a burden for devices to implement and reduces efficiency in utilizing the spectrum asset, for instance, guard bands need to be allocated between carriers and it is challenging to direct traffic to smaller blocks. Further, as spectrum ownership within a network expands, the total number of carriers to aggregate will expand, creating a long list of band/bandwidth combinations that need to be defined in standards. From a hardware standpoint, multiplexers are needed at the transmit end to combine the component carriers and RF filters are needed at the receive end to separate out component carriers. These extra devices increase cost and system complexity.

Accordingly, a solution is needed that reduces complexity while allowing wireless devices to take advantage of the capabilities of multiple spectrum blocks made available by the network without expending the network and wireless device resources required for carrier aggregation.

OVERVIEW

Exemplary embodiments described herein include systems, methods, and access nodes for implementing a filter defined carrier encompassing multiple spectrum blocks. An exemplary method includes selecting, at an access node, a frequency range encompassing multiple spectrum blocks and applying a digital filter to the frequency range to eliminate at least one spectrum block thereby defining a carrier having available spectrum blocks. The method additionally includes allowing a wireless device to connect to the access node utilizing at least one of the available spectrum blocks within the carrier, the available spectrum blocks not including the at least one spectrum block eliminated by the digital filter.

In an additional embodiment, an access node is provided. The access node includes at least one processor performing multiple operations. The operations include defining a frequency range encompassing multiple spectrum blocks and applying a digital filter to the frequency range to eliminate at least one spectrum block, thereby defining a carrier having available spectrum blocks. The operations additionally include allowing a wireless device to connect to the access node using at least one of the available spectrum blocks within the carrier, the available spectrum blocks not including the at least one spectrum block eliminated by the digital filter.

In a further exemplary embodiment, a method comprises defining, at an access node, a frequency range encompassing multiple spectrum blocks. The method additionally includes applying a digital filter to the frequency range to eliminate at least one spectrum block within the frequency range to define a carrier having a profile. The method further includes comparing the profile to capabilities of a wireless device and allowing the wireless device to connect to the access node in compliance with the profile.

In yet further embodiments, a non-transitory computer readable medium storing instructions for execution by a processor is provided. When executed by a processor, the instructions cause multiple operations and steps to be performed as set forth above.

BRIEF DESCRIPTION OF THE DRAWINGS

FIG. 2 is a block diagram depicting creation of an enhanced width carrier in accordance with the disclosed embodiments.

FIG. 3 is a block diagram depicting an additional scenario for creating an enhanced width carrier in accordance with disclosed embodiments.

FIG. 7 depicts another exemplary method for defining an enhanced width carrier in accordance with disclosed embodiments.

FIG. 8 depicts another exemplary embodiment for defining and aggregating multiple enhanced width carriers.

DETAILED DESCRIPTION

Figure 1:
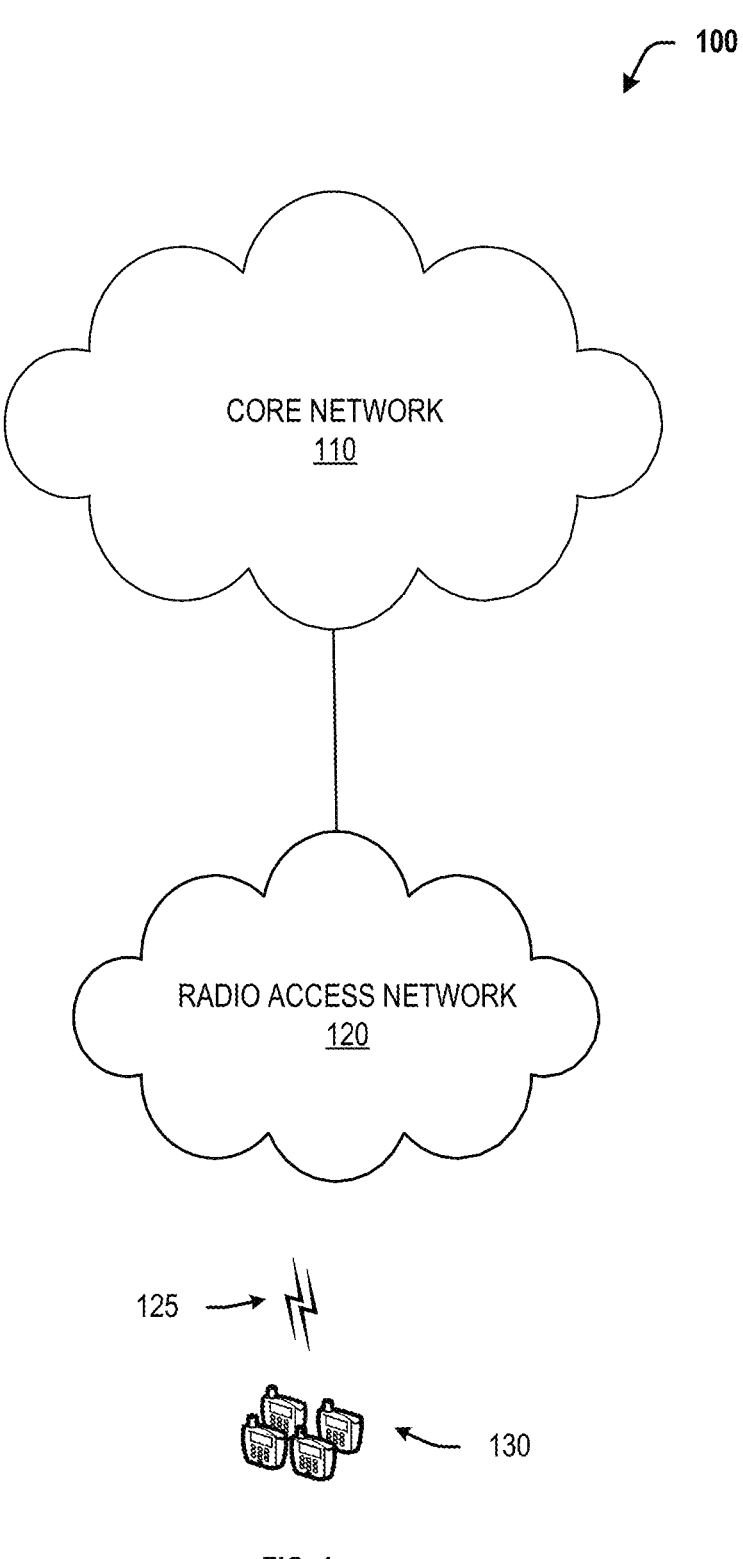
FIG. 1 depicts an exemplary system for wireless communication, in accordance with the disclosed embodiments.

Exemplary embodiments described herein include systems, methods, and computer readable mediums for using a filter to define a wide single carrier to replace multiple fragmented component carriers. More specifically, embodiments set forth herein include enhanced logic for selecting, at an access node, a frequency range encompassing multiple spectrum blocks and applying a digital filter to the frequency range to eliminate at least one spectrum block within the frequency range to thereby define a carrier having available spectrum blocks. The method further includes allowing a wireless device to connect to the access node utilizing at least one of the available spectrum blocks within the carrier, the available spectrum blocks not including the at least one spectrum block eliminated by the digital filter.

Further, in some embodiments, the network allows to the wireless device to connect via all of the available spectrum blocks of the carrier simultaneously. In embodiments set forth herein, the eliminated spectrum blocks are reserved for specific uses, such as, for example, emergency or disaster management communications. Hundreds of different frequencies may be reserved for various types of emergency communications. In other embodiments, the eliminated spectrum blocks correspond to frequencies owned by specific communications entities, such as mobile carriers or governmental entities.

In embodiments set forth herein, the access node receives a UE capability report from the wireless devices and compares the available spectrum blocks with received UE capabilities from the UE capability report. For example, the access node may define a profile for the carrier based on the available spectrum blocks and compare the profile to a received UE capability report. The access node may select spectrum blocks available to the UE based on the comparison and send information identifying the selected spectrum blocks to the wireless device, for example, in an RRC reconfiguration request or during an attach procedure.

Embodiments disclosed herein allow the wireless device to connect to the access node using multiple selected spectrum blocks within the carrier. Further, the access node may communicate information identifying the available or selected spectrum blocks to the wireless device using a system information block (SIB).

While some embodiments may define a carrier having multiple spectrum blocks within a single frequency band, other embodiments are possible. For example, the access node may define a carrier encompassing spectrum blocks from multiple frequency bands. Further, the access node may define multiple carriers encompassing multiple frequency bands and apply a corresponding digital filter to each of the multiple carriers.

In embodiments set forth herein, the network may be a 5G NR network or a combined 4G/5G network. An exemplary system described herein includes at least an access node (or base station), such as an eNodeB, or gNodeB, and a plurality of end-user wireless devices. The disclosed technology may be applied to communication between an end-user wireless device and an access node (e.g., base station) and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations of using a filter to define a wide carrier may be implemented as computer-readable instructions or methods and processing nodes on the network for executing the instructions or methods. The processing node may include a processor included in the access node or a processor included in any controller node in the wireless network that is coupled to the access node.

FIG. 1 depicts an exemplary communication network 100. A core network 110 is coupled to a radio access network (RAN) 120 that serves wireless devices 130 over communication links 125. For example, the wireless devices 130 can be end-user wireless devices (e.g., UEs), communication links 125 use 5G NR, 4G LTE, or any other suitable type of radio access technology (RAT), and core network 110 can be structured using a service-based architecture (SBA) utilizing core network functions and elements, including, for example, user plane functions (UPF) control plane functions (CPF).

The RAN 120 can include various access network functions and devices disposed between the core network 110 and the end-user wireless devices 130. For example, the RAN 120 includes at least an access node (or base station), such as an eNodeB and/or gNodeB communicating with the plurality of end-user wireless devices 130. It is understood that the disclosed technology may also be applied to communication between an end-user wireless device and other network resources, depending on the RAT and network technology being implemented. Further, either of core network 110 and radio access network 120 can include one or more of a local area network, a wide area network, and an internetwork (including the Internet) and capable of communicating signals and carrying data, for example, to support voice, push-to-talk, broadcast video, and data communications by end-user wireless devices 130. Alternatively or additionally to the UPF and CPF, the illustrated network topology can include packet gateways, such as a CUPS based user plane S-GW, P-GW, or SAE-GW.

The core network 110 may incorporate many functions not shown in FIG. 1. For example, the CPF may include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The UPF may also include, for example, a Unified Data Repository (UDR). The CPF can provide one or more network functions based on a request-response or subscribe-notify model. The network functions may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 110. To use other network functions, registered functions can send service requests to the NRF.

The UDM interfaces with network functions such as AMF and SMF so that relevant data becomes available to AMF and SMF. The UDM generates authentication vectors when requested by the AUSF, which acts as an authentication server. The AMF performs the role of access point to the 5G core, thereby terminating RAN control plane and UE traffic originating on either the N1 or N2 reference interface. In the 5G core, the functionality of the 4G Mobility Management Entity (MME) is decomposed into the AMF and the SMF. The AMF receives all connection and session related information from the UE using N1 and N2 interfaces and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Wireless devices 130 may be any device, system, combination of devices, or other such communication platform capable of communicating wirelessly with RAN 120 using one or more frequency bands deployed therefrom. Each of wireless devices 130 may be, for example, a mobile phone, a wireless phone, a wireless modem, a customer premises equipment (CPE), a personal digital assistant (PDA), a voice over internet protocol (VoIP) phone, a voice over packet (VOP) phone, or a soft phone, as well as other types of devices or systems that can exchange audio or data via RAN 120. Other types of communication platforms are possible. Different types of mobile phones or wireless devices 130 are able to communicate over different spectrum blocks within the frequency spectrum.

Additionally, in recent years, networks have evolved to connect with the Internet of things (IoT), which describes the network of physical objects or things that are embedded with sensors, software, and other technologies for the purpose of connecting and exchanging data with other devices and systems over the Internet. Cellular IoT is a way of connecting physical things, such as sensors to the internet by having them utilize the same mobile networks as wireless devices. In the consumer market, IoT technology is frequently utilized to equip the "smart home", including devices and appliances such as lighting fixtures, thermostats, home security systems and cameras, and other appliances that support one or more common ecosystems, and can be controlled via devices associated with that ecosystem, such as smartphones and smart speakers.

Cellular IoT applications generally use one of two technologies: narrowband (NB)-IoT and Category M1 (Cat-M1), which are both 3GPP standardized technologies. The technologies address different types of use cases based on their capabilities. NB-IoT supports devices with very narrow bandwidth, 200 kHz. Due to its narrow bandwidth, the data rate peaks at around 250 kilobits per second (kbps). An NB-IoT carrier can be deployed even in guard-band of an LIE carrier. Common use cases of NB-IoT include utility meters and sensors. Cat-M1 operates at 1.4 MHz bandwidth with higher device complexity/cost than NB-IoT. The wider bandwidth allows Cat-M1 to achieve greater data rates (up to 1 Mbps), lower latency and more accurate device positioning capabilities.

Accordingly, the wireless devices 130 may include Cat-M1 and/or NB-IoT devices in addition to more traditional wireless devices. In embodiments set forth herein, both Cat M1 and NB-IoT devices as well as hybrid devices capable of utilizing both technologies may operate within a cell simultaneously.

Other network elements may be present to facilitate communication but are omitted for clarity, such as base stations, base station controllers, mobile switching centers, dispatch application processors, and location registers such as a home location register or visitor location register. Components not specifically shown in FIG. 1 can further include processing nodes, controller nodes, routers, gateways, and physical and/or wireless data links for communicating signals among various network elements, additional base stations, controller nodes, telephony switches, internet routers, network gateways, computer systems, communication links, or other type of communication equipment, and combinations thereof.

FIG. 2 is a block diagram 200 illustrating the formation of single wide carrier from multiple carriers in accordance with disclosed embodiments. Carrier 210 is located in a first position along a frequency spectrum 202 and carrier 220 is located at a second position along the frequency spectrum 202. In the illustrated embodiment, carrier 210 and carrier 220 may be located within the same frequency band. However, in some embodiments, carrier 210 and carrier 220 may be located within different frequency bands.

Multiple other carriers may exist between carrier 210 and carrier 220. However, in embodiments provided herein, those intervening carriers may not be usable for a number of reasons. First, different mobile carriers or network operators own only specific portions of the frequency spectrum and can only use those portions. Further, various portions of the frequency spectrum may be reserved for emergency calls or emergency notifications and may in some instances be owned by government agencies.

Accordingly, embodiments provided herein implement a digital filter 240 to create a single carrier 230 from the multiple carriers 210 and 220. Further, although only two spectrum blocks or carriers 210 and 220 are shown, the digital filter 240 may be modified as required to incorporate additional spectrum blocks into the single carrier 230.

FIG. 3 depicts an exemplary environment 300 for further embodiments for creation of a single wide carrier as set forth herein. FIG. 3 illustrates the formation of single wide carrier 330 from multiple carriers 310 and 320 which may be in different frequency bands. Carrier 310 may be located in a first frequency band 302 and carrier 320 may be located in a second frequency band 304.

Multiple other carriers may exist along the spectrum 306 between carrier 310 and carrier 320. However, in embodiments provided herein, those intervening carriers may not be usable for a number of reasons. First, different mobile carriers or network operators own only specific portions of the frequency spectrum and can only use those portions. Further, various portions of the frequency spectrum may be reserved for emergency calls or emergency notifications and may in some instances be owned by government agencies.

Accordingly, embodiments provided herein implement a digital filter 340 to create the single carrier 330 from the multiple carriers 310 and 320. Further, although only two spectrum blocks or carriers 310 and 320 are shown, the digital filter 340 may be modified as required to incorporate additional spectrum blocks into the single carrier 330.

FIGS. 4A-D illustrate various configurations for a digital filter that may be implemented in conjunction with embodiments provided herein. A digital filter is a system that performs mathematical operations on a sampled, discrete-time signal to reduce or enhance certain aspects of that signal. A digital filter system usually includes an analog-to-digital converter (ADC) to sample the input signal, followed by a microprocessor and some peripheral components such as memory to store data and filter coefficients. Program Instructions running on the microprocessor implement the digital filter by performing necessary mathematical operations on the numbers received from the ADC. In some high performance applications, a field programmable gate array (FPGA) or application specific integrated circuit (ASIC) is used instead of a general purpose microprocessor, or a specialized digital signal processor (DSP) with specific paralleled architecture for expediting operations such as filtering.

Figure 4A:
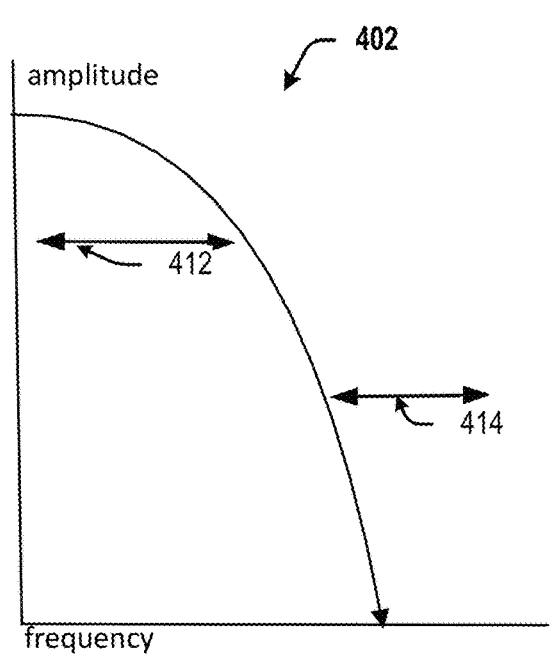
FIGS. 4A-D are graphs depicting digital filters in accordance with disclosed embodiments.
Figure 4C:
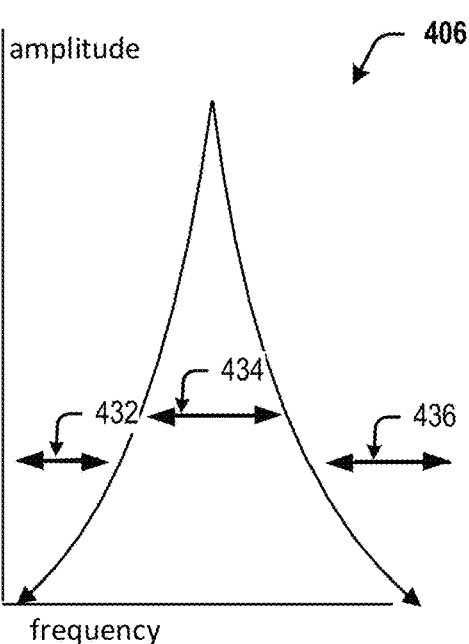
Figure 4B:
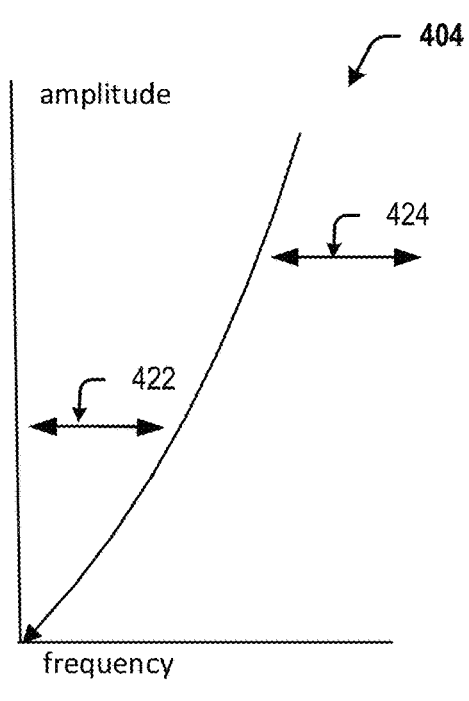
Figure 4D:
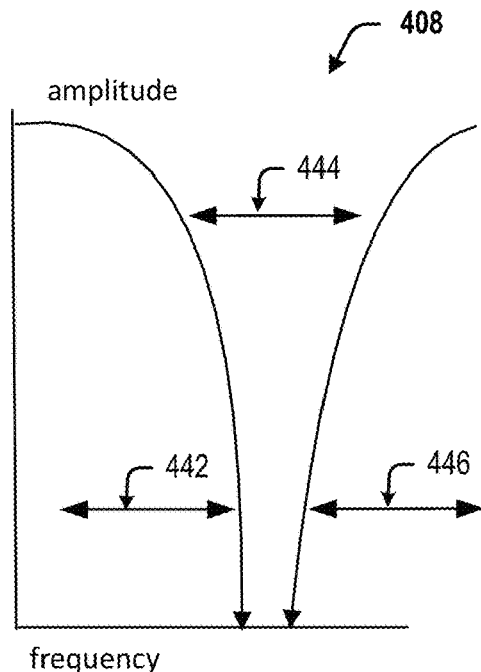

Digital filters may, in some embodiments, be provided at both the wireless device and the access node. The digital filter may, for example, be or include a finite impulse response (FIR) filter operating on input signals to take one sequence of numbers and produce another as the filtered output signal. Various types of filters may be implemented, including for example a lowpass filter 402 as shown in FIG. 4A, a highpass filter 404 as shown in FIG. 4B, a bandpass filter 406 as shown in FIG. 4C, and a band reject filter 408 as shown in FIG. 4D. These filters may be used separately or in combination depending on the selected spectrum blocks.

The filters illustrated in FIGS. 4A-4D illustrate frequency along the x-axis and amplitude along the y-axis. The lowpass filter 402 of FIG. 4A shows a range of passed signals at 412 and a higher ranged of blocked signals at 414. Conversely, the highpass filter 404 of FIG. 4B illustrates a blocked range of signals at 422 and a higher passed range of signals at 424. FIG. 4C illustrates a bandpass filter 406 that functions as a combination of a lowpass and highpass filter and allows frequencies above a certain point and below another. Accordingly, blocked frequencies are shown at 432 and 436 and passed frequencies are shown at 434.

FIG. 4D illustrates a band reject filter 408. In embodiments set forth herein, multiple band reject filters 408 may be utilized. The band reject filter 408 may reject or attenuate a middle spectrum block at 444 and pass lower frequencies 442 and higher frequencies at 446.

Thus, embodiments set forth herein may use combinations of digital filters based on selected spectrum blocks. As set forth herein, the selected spectrum blocks may simply be the spectrum blocks owned by a particular communications entity such as, for example, a mobile carrier. Spectrum blocks excluded may be those owned by other communications entities, those reserved for emergency signaling, or spectrum blocks unavailable for any other reason.

Figure 5:
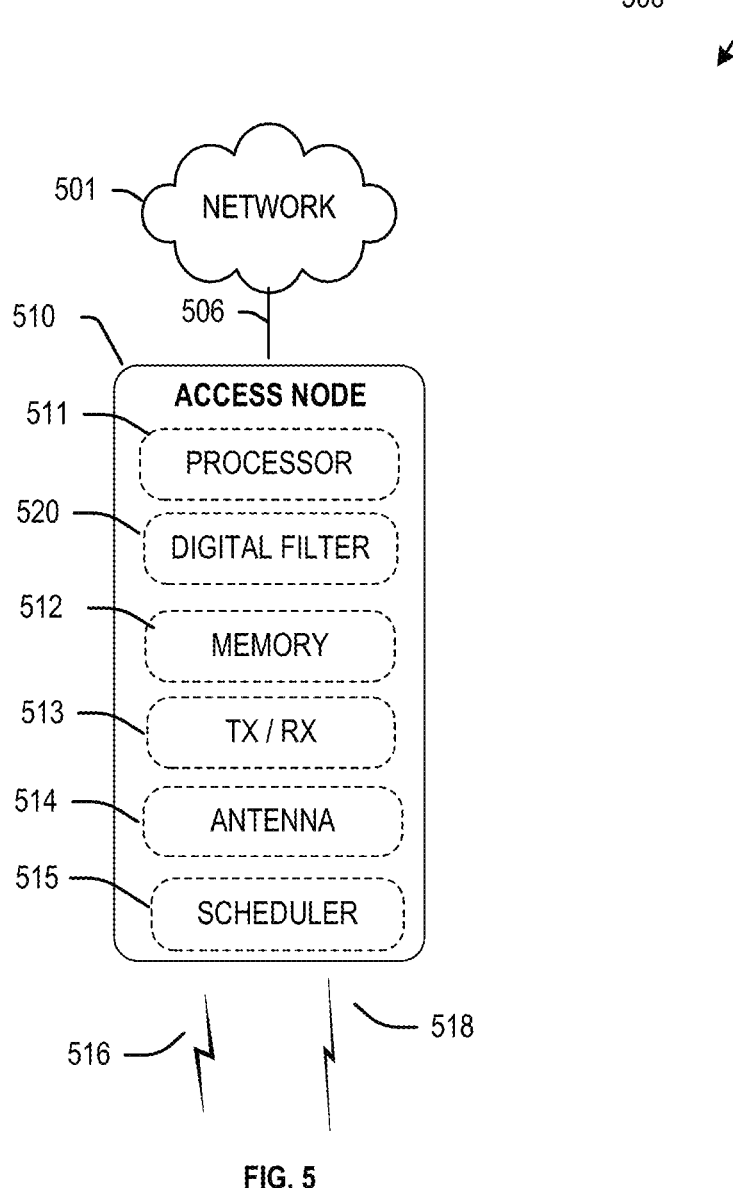
FIG. 5 depicts an exemplary configuration of an access node in accordance with disclosed embodiments.

FIG. 5 is a block diagram 500 depicting an exemplary access node 510 for use with embodiments set forth herein. Access node 510 may comprise, for example, a macro-cell access node, such as the access nodes described with reference to FIG. 1. Access node 510 may be connected to a network 501 using communication link 506. Access node 510 is illustrated as comprising a processor 511, memory 512, transceiver(s) 513, antenna(s) 514, and scheduler 515. The access node 510 is also illustrated as including a digital filter 520. Processor 511 executes instructions stored on memory 512, while transceiver(s) 513 and antenna(s) 514 enable wireless communication with other network nodes, such as wireless devices and other nodes.

For example, access node 510 may be configured to select particular spectrum blocks based on ownership of the spectrum blocks and/or required exclusion of particular spectrum blocks, define a carrier encompassing the spectrum blocks, and a apply the digital filter 520 to create a profile for the carrier. Further, the access node 510 may be configured to match the profile of the carrier with UE capabilities and communicate information identifying matching spectrum blocks to the UE.

Scheduler 515 may be provided for scheduling resources based on the presence of the wireless devices. These features may be enabled by access node 510 comprising co-located cells, or antenna/transceiver combinations that are mounted on the same structure. Network 501 may be similar to network 101 discussed above. Wireless communication links 516 and 518 may provide communication with the access node 510 over one or more RATs. In some embodiments, the wireless devices may operate in NB-IoT mode or Cat M1 mode enabling the wireless devices to communicate with access node 510 over a relatively narrow bandwidth.

Further, instructions stored on memory 512 can include instructions for defining a carrier profile and matching the carrier profile with wireless device capabilities as further set forth herein. Methods for defining the carrier utilizing a digital filter are further explained below with reference to FIGS. 6 and 7. The instructions may facilitate selection of spectrum blocks, application of digital filter to develop a carrier having a profile, comparing the profile with wireless device capabilities as will be further described herein, and communicating information identifying the matching spectrum blocks to the wireless device.

Figure 6:
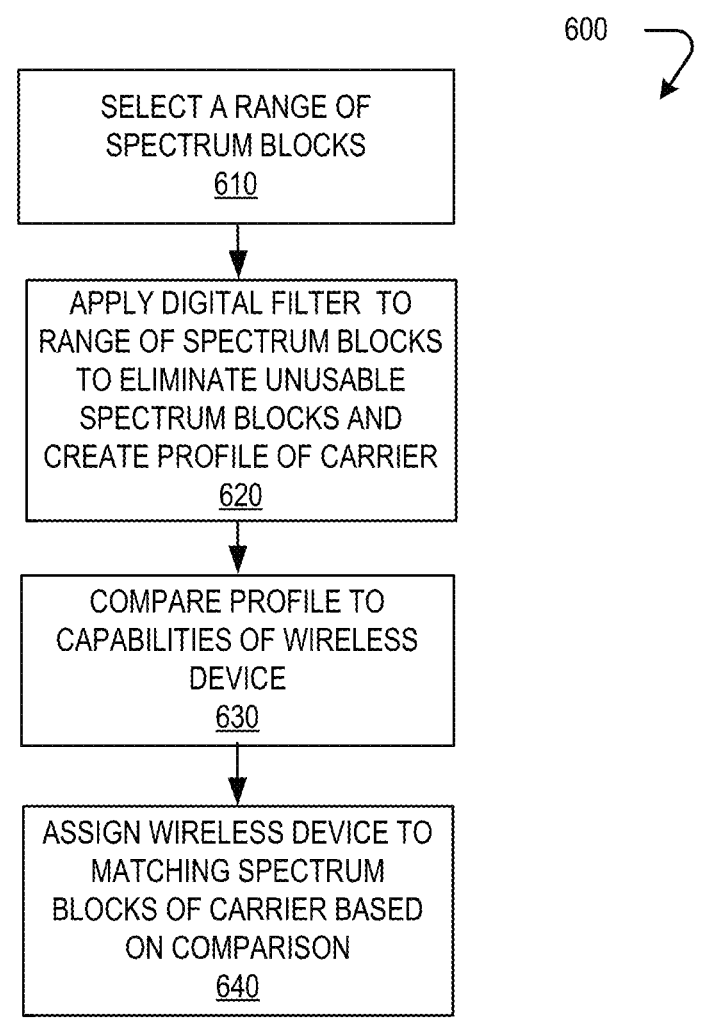
FIG. 6 depicts an exemplary method for defining an enhanced width carrier in accordance with disclosed embodiments.

The disclosed methods for performing definition of a carrier are further described with references to FIGS. 6 and 7 below. FIG. 6 illustrates an exemplary method 600 for defining a carrier using a digital filter in accordance with disclosed embodiments. Method 600 may be performed by any suitable processor discussed herein, for example, a processor included in the access node 510. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 600 starts in step 610 when the access node 510 or similar component selects a range of spectrum blocks. In embodiment set forth herein, this selection could be made within a particular frequency band. For example, the access node 510 or similar component selects a frequency band and within that frequency band, selects a lowest spectrum block usable in the network and a highest spectrum block in the frequency band usable by the network. The access node may define this range of spectrum blocks as a wide carrier and then apply a digital filter knocking out unusable blocks to the generate a profile of the carrier in step 620.

The application of the digital filter in step 620 eliminates unusable spectrum blocks from the profile of the carrier. As set forth above, these unusable spectrum blocks may be spectrum blocks exclusively owned by other communications entities operating other networks or spectrum blocks reserved exclusively for other uses, such as emergency notifications. The digital filter, may, for example be a band reject filter illustrated in FIG. 4D or a combination of band reject filters. The digital filter may alternatively or additionally be a combination of low pass filters, high pass filters, and bandpass filters as illustrated in FIGS. 4A-4C.

In step 630, the access node 510 compares the created profile of the carrier to capabilities of a wireless device. The access node 510 may, for example, receive the capabilities of the wireless device in a UE capability report, transmitted from the wireless device to the access node 510. The UE capability report may, for example, be transmitted during an attach procedure. The UE capabilities may alternatively be transmitted, for example, in a channel state information (CIS) report, sent periodically from the wireless device to the access node. The access node 510 compares the profile with the UE capabilities to transmit and receive using various spectrum blocks and selects one or more of the common spectrum blocks for use by the UE.

In step 640, the access node 510 assigns the wireless device to matching spectrum blocks. The access node 510 may make this assignment, for example, by communicating information identifying the available spectrum blocks to the wireless device using a system information block (SIB). The access node 510 may further send information identifying the available spectrum blocks in a radio resource control (RRC) connection reconfiguration message to the wireless device. In an alternative embodiment, the access node may send the profile to the UE, for example in an RRC reconfiguration message and the wireless device may perform the comparison and select spectrum blocks for transmission and reception. In this embodiment, the wireless device, e.g., wireless device 130 of FIG. 1, would be provided with enhanced logic enabling selection of spectrum blocks.

FIG. 7 depicts another exemplary method for defining a carrier using a profile in accordance with disclosed embodiments. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 700 may be performed by a processor, for example processor 511 of access node 510. In step 710, the access node 510 selects a range of spectrum blocks. In embodiment set forth herein, this selection could be made within a particular frequency band. For example, the access node 510 or similar component selects a frequency band and within that frequency band, selects a lowest spectrum block usable in the network and a highest spectrum block in the frequency band usable by the network.

In step 712, the access node 510 determines if any of the spectrum blocks within the defined range are reserved. Reserved spectrum blocks may be spectrum blocks exclusively owned by other communications entities operating other networks or spectrum blocks reserved exclusively for other uses, such as emergency notification. Other reasons for reserving spectrum blocks are within scope of the disclosure.

If spectrum blocks are reserved in step 712, the access node 510 defines a digital filter for excluding the reserved spectrum blocks. The digital filter, may, for example be a band reject filter illustrated in FIG. 4D or a combination of band reject filters. The digital filter may alternatively or additionally be a combination of low pass filters, high pass filters, and bandpass filters as illustrated in FIGS. 4A-4C.

In step 730, the access node 510 applies the digital filter to the frequency range to define a carrier having a profile. Thus, the access node 510 may define this range of spectrum blocks as a wide carrier and then apply a digital filter to generate a profile of the carrier in step 730.

In step 740, the access node 510 may receive and process a UE capability report from a wireless device and in step 750, the access node 510 may compare the profile to the UE capability report to determine matching spectrum blocks. In step 760, the access node 510 sends information identifying matching spectrum blocks, for example during an RRC reconfiguration request, and/or in a SIB, to the wireless device. The wireless device then utilizes the communicated spectrum blocks for transmission.

FIG. 8 depicts another exemplary embodiment 800 for defining a single enhanced width carrier from multiple enhanced width carriers. Method 800 may be performed by a processor, for example processor 511 of access node 510. In step 810, the processor 511 of the access node 510 or another processor within a network may select a first frequency range. The selected first frequency range may be within a single frequency band or potentially may encompass more than one frequency band, e.g., two adjacent frequency bands. The first selected frequency band includes multiple spectrum blocks, some of which are reserved or unavailable as described above.

In step 820, the processor 511 or other processor defines a first digital filter specifically to exclude reserved spectrum blocks within the first frequency range, but encompass all available spectrum blocks within the first frequency range. In step 830, the processor 511 applies the first digital filter to the first frequency range, to define a first carrier having a specific profile excluding the reserved spectrum blocks, but including all other spectrum blocks in the first frequency range.

In step 840, the processor 511 selects a second frequency range including multiple spectrum blocks. Typically, the second frequency range is separate from and does not overlap with the first frequency range. Further, the second frequency range may not be adjacent to or contiguous with the first frequency range. The selected second frequency range may be within a single frequency band or potentially within multiple frequency bands. If the second frequency range includes multiple frequency bands, they may be adjacent to one another. The second selected frequency band includes multiple spectrum blocks, at least one of which is reserved and thus unavailable as described above.

In step 850, the processor 511 defines a second filter excluding the reserved spectrum blocks in the second frequency range. In step 860, the processor 511 applies the second filter to the second frequency range to define a second carrier having a second profile that excludes the reserved spectrum blocks in the second frequency range, but includes all of the available spectrum blocks in the second frequency range. Thus, through steps 810-860, two separate profiles are created in two frequency ranges.

In step 870, the processor 511 aggregates the first and second created carriers, for example, by carrier aggregation. The aggregated profiles or the individual profiles may also be compared with UE capabilities as described above with respect to FIGS. 6 and 7. The access node may report matching spectrum bands to the UEs, for example, in an RRC reconfiguration message as described above.

Although FIGS. 6, 7, and 8 are described in conjunction with UEs generally, it should be noted that the methods of FIGS. 6-8 are easily adaptable to Cat-M1 and NB-IoT devices, which operate with narrower bandwidths and would therefore generally transmit over fewer available spectrum blocks.

In some embodiments, methods 600, 700, and 800 may include additional steps or operations. Thus, the methods may include steps shown in each of the other methods. As one of ordinary skill in the art would understand, the methods 600, 700 and 800 may be integrated in any useful manner.

Figure 9A:
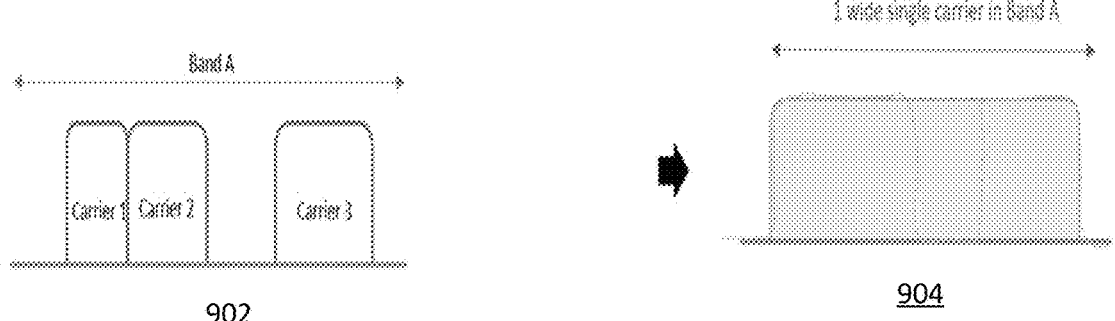
FIGS. 9A-9C illustrate examples for implementing digital filters to create enhanced width carriers and to utilize multiple spectrum blocks from the same or different spectrum bands.
Figure 9B:
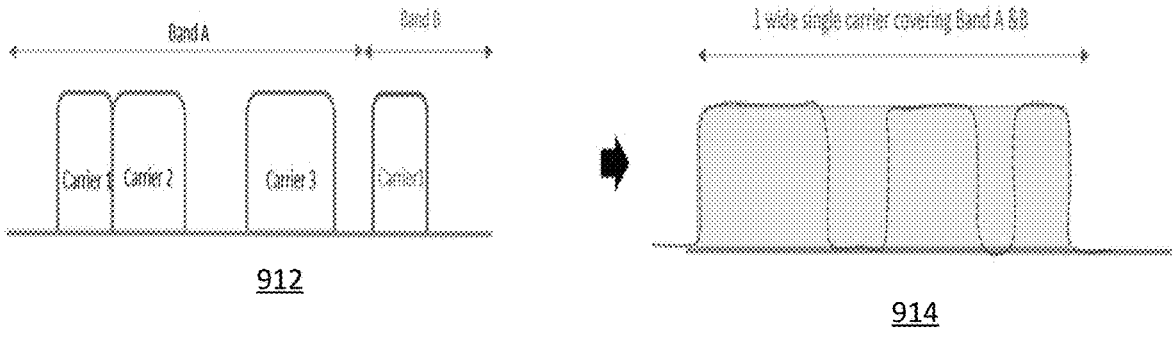
Figure 9C:
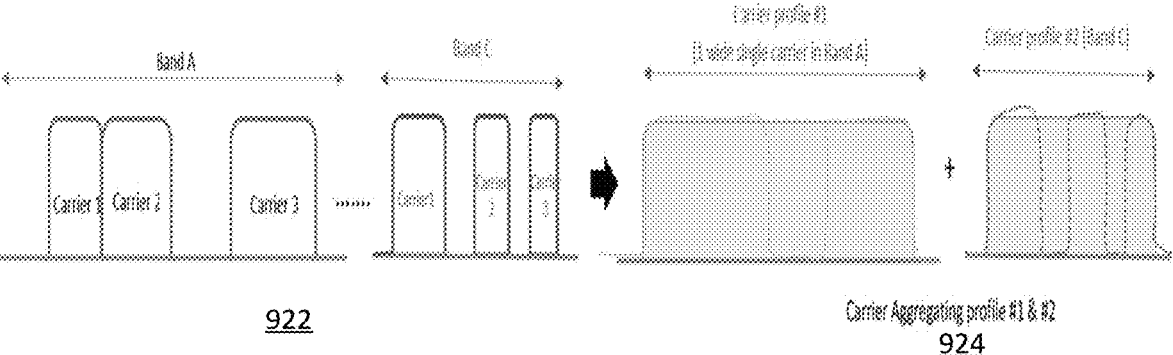

FIGS. 9A-9C illustrate further examples of the use of a digital filter to create a single wide carrier. FIG. 9A illustrates carrier 1, carrier 2, and carrier 3 in a single Band A at 902. At 904, a digital filter is applied to create a carrier profile covering multiple spectrum blocks within a single band (Band A). The digital filter causes the carrier profile to omit reserved spectrum blocks as described above.

FIG. 9B illustrates, at 912, a carrier 1, carrier 2, and carrier 3 located in Band A. An additional carrier 1 is located in Band B. A single digital filter is applied to the configuration of 912 including both Band A and Band B to create a carrier profile including a single wide carrier covering both Band A and Band B at 914, with reserved spectrum blocks omitted from the single wide carrier. Thus, the carrier profile at 914 covers multiple spectrum blocks beyond a single band. This scenario may be facilitated when two bands, such as Band A and Band B are adjacent, or within a small pre-determined distance from one another.

FIG. 9C illustrates at 922 a carrier 1, carrier 2, and a carrier 3 in Band A and another carrier 1, carrier 2, and carrier 3 in Band C. In this example, it is assumed that Band A and Band C are not adjacent to one another. Two digital filters may be applied, i.e., a first digital filter to Band A and a second digital filter to Band C, to create two carrier profiles at 924. The two carrier profiles include one carrier profile for Band A and another carrier profile for Band C, each omitting reserved spectrum blocks in the applicable band. However, the two carrier profiles may be aggregated to cover multiple spectrum blocks beyond a single band. The example of FIG. 9C is applicable when the two bands are not adjacent and may be distant from one another. Thus, in this example, the two carrier profiles may be aggregated in the same manner as two carriers are currently aggregated using carrier aggregation. In general, in existing applications, a component carrier is a contiguous block of spectrum. However, in embodiments disclosed herein, the filter defined carrier profile, which omits reserved spectrum blocks, can also be viewed as a component carrier.

By the methods described herein, a single carrier encompassing multiple spectrum blocks is created using a digital filter. The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
selecting, at an access node, a frequency range encompassing multiple spectrum blocks, the frequency range encompassing multiple frequency bands;
applying a digital filter to the frequency range to eliminate at least one unusable spectrum block within the frequency range to thereby define a single carrier without using carrier aggregation of multiple carriers combining available spectrum blocks from the multiple frequency bands;
matching wireless device capabilities of a wireless device with the multiple available spectrum blocks of the single carrier that is defined without using carrier aggregation of multiple carriers to determine matching spectrum blocks from the single carrier; and
allowing the wireless device to connect to the access node utilizing the matching spectrum blocks from the multiple available spectrum blocks of the multiple frequency bands within the single carrier without using carrier aggregation of multiple carriers, the available spectrum blocks not including the at least one unusable spectrum block eliminated by the digital filter.

2. The method of claim 1, further comprising receiving a user equipment (UE) capability report from the wireless device.

3. The method of claim 2, further comprising comparing the available spectrum blocks with received UE capabilities from the UE capability report.

4. The method of claim 3, further comprising selecting spectrum blocks available to the wireless device as the matching spectrum blocks based on the comparison.

5. The method of claim 4, further comprising sending information identifying the selected spectrum blocks to the wireless device.

6. The method of claim 1, further comprising communicating information identifying the available spectrum blocks to the wireless device during an attach procedure.

7. The method of claim 1, further comprising allowing the wireless device to connect to the access node using multiple available spectrum blocks within the carrier.

8. The method of claim 1, further comprising communicating the available spectrum blocks to the wireless device using a system information block (SIB).

9. The method of claim 1, further comprising defining a profile based on the available spectrum blocks and comparing the profile to a received user equipment (UE) capability report.

10. The method of claim 1 further, comprising defining at least one additional carrier encompassing multiple frequency bands.

11. An access node comprising:

at least one processor performing operations including:

selecting a frequency range encompassing multiple spectrum blocks, the frequency range encompassing multiple frequency bands;

applying a digital filter to the frequency range to eliminate at least one unusable spectrum block within the frequency range, thereby defining a single carrier without using carrier aggregation of multiple carriers combining available spectrum blocks from the multiple frequency bands;

matching wireless device capabilities of a wireless device with the multiple available spectrum blocks of the single carrier that is defined without using carrier aggregation of multiple carriers to determine matching spectrum blocks from the single carrier; and allowing the wireless device to connect to the access node using the matching spectrum blocks from the multiple available spectrum blocks of the multiple frequency bands of the single carrier, without using carrier aggregation of multiple carriers, the available spectrum blocks not including the at least one unusable spectrum block eliminated by the digital filter.

12. The access node of claim 11, the operations further comprising receiving a user equipment UE capability report from the wireless device.

13. The access node of claim 12, the operations further comprising comparing the available spectrum blocks with received UE capabilities from the UE capability report.

14. The access node of claim 13, the operations further comprising selecting spectrum blocks available to the wireless device based on the comparison.

15. The access node of claim 14, the operations further comprising sending information identifying the selected spectrum blocks to the wireless device.

16. The access node of claim 11, the operations further comprising communicating information identifying the available spectrum blocks to the wireless device during an attach procedure.

17. The access node of claim 11, the operations further comprising allowing the wireless device to connect to the access node using multiple available spectrum blocks within the carrier.

18. A method comprising:

selecting, at an access node, a frequency range encompassing multiple spectrum blocks, the frequency range encompassing multiple frequency bands;

applying a digital filter to the frequency range including the multiple frequency bands to eliminate at least one unusable spectrum block within the frequency range to create a profile of a single carrier without using carrier aggregation of multiple carriers within the multiple frequency bands;

comparing the profile of the single carrier including the multiple available spectrum blocks to capabilities of a wireless device to enable matching of wireless device capabilities with the multiple available spectrum blocks of the single carrier to determine matching spectrum blocks from the single carrier that is defined without using carrier aggregation of multiple carriers; and allowing the wireless device to connect to the access node without using carrier aggregation of multiple carriers in compliance with the profile of the single carrier based on the comparison.

19. The method of claim 18, further comprising selecting at least one spectrum block of the single carrier based on the comparison.

20. The method of claim 19, further comprising sending information identifying the selected spectrum block to the wireless device using a system information block (SIB).

* * * * *